Figure 1:
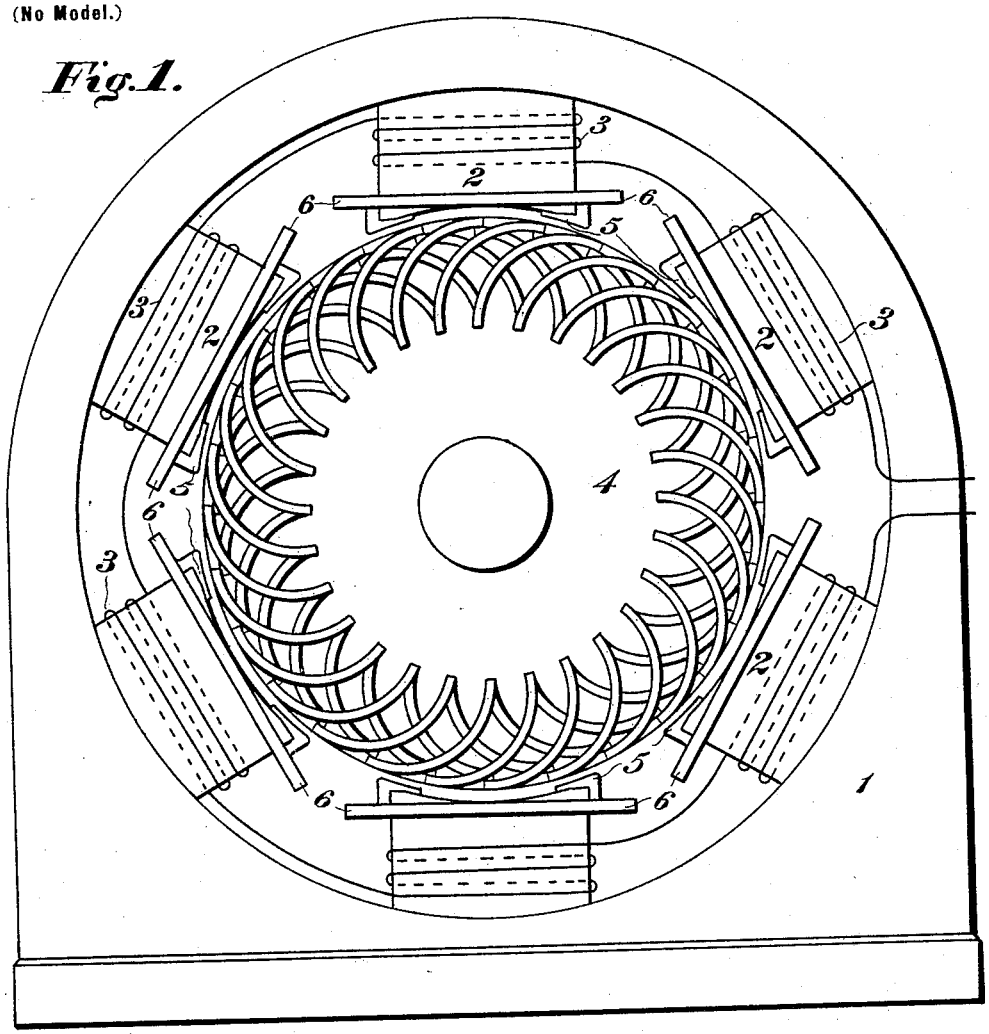

No. 626,172. Patented May 30, 1899.
B. G. LAMME.
ROTARY TRANSFORMER OR SYNCHRONOUS MOTOR.
(Application filed July 24, 1897.)
(No Model.)

WITNESSES:
Ethan J. Dodds
D. C. Tener

INVENTOR
Benjamin G. Lamme.
BY
Wesley G. Carr
ATTORNEY.

UNITED STATES PATENT OFFICE.

BENJAMIN G. LAMME, OF PITTSBURG, PENNSYLVANIA, ASSIGNOR TO THE WESTINGHOUSE ELECTRIC AND MANUFACTURING COMPANY, OF PENNSYLVANIA.

ROTARY TRANSFORMER OR SYNCHRONOUS MOTOR.

SPECIFICATION forming part of Letters Patent No. 626,172, dated May 30, 1899.

Application filed July 24, 1897. Serial No. 645,796. (No model.)

*To all whom it may concern:*

Be it known that I, BENJAMIN G. LAMME, a citizen of the United States, residing in Pittsburg, in the county of Allegheny and State of Pennsylvania, have invented a new and useful Improvement in Rotary Transformers or Synchronous Motors, (Case No. 749,) of which the following is a specification.

My invention relates to rotary transformers or synchronous motors; and it has for its object to provide a means whereby irregularities in operation due to distortion of the magnetic fields of such machines may be obviated.

It has been found in practice that under certain conditions the rotating members of rotary transformers or synchronous motors will alternately gain and lose in speed at a more or less regular rate, thus producing certain injurious effects upon such machines and also upon the generator and other apparatus included in the system. This irregular action I term "pumping," and I consider it to be primarily due to one or more of several causes, such as irregular speed of the generator, difference in the form of the electromotive-force waves of the generator, and the motor or rotary transformer, &c. The immediate cause of the pumping lies, mainly or largely, in the distortion of the field of the motor or transformer when its armature has been forced for an instant to run at a speed either slightly greater or slightly less than the normal or synchronous speed. This distortion of the field of the machine may be explained as follows: If the armature of either an alternating or direct current generator or motor is carrying current, its ampere-turns have a cross-magnetizing effect on the pole tips or edges, which tends to strengthen one edge and weaken the other. The resultant field is thus shifted either forward or backward, depending on the action of the alternating current. In the case of a synchronous motor at no load there should be very little armature-current, and therefore a small degree of distortion of the field. If the alternations applied are suddenly changed, however, the motor-armature will take considerable current, the resulting field will be shifted, and the armature will tend to move into a new position in this field. In doing this the field-distortion, wave form, &c., are somewhat changed. The armature takes a current in the opposite direction for an instant—that is, if in the first case it receives current as a motor it will begin to deliver power for an instant. This distorts the field in the opposite direction, and the armature tends to swing the other way. If in the one case it was accelerating in speed, it in the other begins to drop in speed. Thus the armature may get into a sort of oscillation relative to the normal or synchronous speed. This oscillation or pumping may be very small for a time and gradually increase until it is so violent that the machine is thrown out of step with the system. The armature-current due to the pumping is in turn a leading and a lagging current which will tend to alternately strengthen and weaken the field-magnetism. The field-current will also oscillate with the pumping of the armature.

In a rotary transformer-armature the ampere-turns due to the current supplied are at all loads directly equal to the ampere-turns of the current delivered. Consequently there should be but little distortion. If an oscillation is started, however, the incoming alternating current represents more ampere-turns than the current delivered. This will produce distortion, as in a synchronous motor, and as the field alternately strengthens and weakens the electromotive force varies and the transformer pumps. In order to remedy this defect, I prevent the alternate distortion or reduce it to a comparatively small amount by placing copper shields or plates over or around the pole tips or edges and copper rings around the ends of the pole-pieces. If these shields and rings are of sufficient section and properly placed, the alternate distortion of the field at the tips or edges of the pole-pieces will set up secondary currents in such shields and rings, which will oppose the distortion and neutralize its effect.

Figure 2:
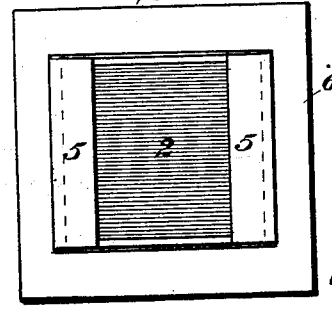

In the accompanying drawings, Figure 1 is an end elevation, largely diagrammatic, of a rotary transformer or synchronous motor provided with my improvement; and Fig. 2 is a face view of a field-magnet pole-piece provided with a ring and a pair of shields.

1 is the field-magnet frame of the machine, having pole-pieces 2, on which are the usual magnetizing-coils 3.

4 represents the armature, which may be of the usual or any desired construction.

5 are shields, which are located at the edges of each of the pole-pieces 2 and extend some distance along the pole-faces between the same and the armature. These shields may extend completely across the pole-face, if desired, without materially affecting the function performed. Each of the pole-pieces is surrounded near its face by a comparatively heavy ring 6 of copper or other good conducting material. As shown, the shields and ring are stamped from a single sheet or plate; but they may be separately made and supported, if desired. The function of these rings or closed coils and the shields has been already set forth and need not be further described, except to say that when employed in connection with a rotary transformer they will, by neutralizing the magnetizing and demagnetizing effects of the armature-currents, assist the machine to deliver a smooth direct current, and, further, if the electromotive-force waves of the generator and rotary transformer are alike in form the closed rings and shields, acting as secondaries to the magnetizing and demagnetizing effects of the armature-currents, will tend to prevent injurious effects by reason of the flow of current between the two machines.

I claim as my invention—

1. A rotary transformer or synchronous alternating-current motor the field-magnet pole-pieces of which are provided with combined low-resistance, non-magnetic rings and end shields, for counteracting the field distortion caused by armature reaction.

2. In a rotary transformer or synchronous alternating-current motor, the combination with an armature and field-magnet, of combined low-resistance rings and shields or plates applied to the inner ends of the field-magnet pole-pieces for preventing disturbing effects due to armature reaction.

3. A rotary transformer or synchronous alternating-current motor each of the field-magnet pole-pieces of which is provided at its inner end with a low-resistance regulating device comprising a conducting shield or shields and a closed secondary coil or ring, formed of a single piece of metal.

In testimony whereof I have hereunto subscribed my name this 22d day of July, A. D. 1897.

BENJ. G. LAMME.

Witnesses:
WESLEY G. CARR,
H. C. TENER.